(12) United States Patent
Dale et al.

(10) Patent No.: US 6,404,106 B1
(45) Date of Patent: Jun. 11, 2002

(54) PRESSURE TOLERANT TRANSDUCER

(75) Inventors: Philip John Dale, Dorset; Grant Smith, Bedford; John Robert Walden, Dorset; Michael James Doble, Fleet, all of (GB)

(73) Assignee: Thales Underwater Systems Limited, Middlesex (GB)

( * ) Notice: Subject to any disclaimer, the term of this patent is extended or adjusted under 35 U.S.C. 154(b) by 0 days.

(21) Appl. No.: 09/541,932

(22) Filed: Apr. 3, 2000

(30) Foreign Application Priority Data

Apr. 1, 1999 (GB) .............................................. 9907692

(51) Int. Cl.$^7$ .............................................. H01L 41/08
(52) U.S. Cl. ........................ 310/324; 310/330; 310/334; 310/337
(58) Field of Search ................................. 310/330, 331, 310/332, 334, 335, 337, 324

(56) References Cited

U.S. PATENT DOCUMENTS 2,967,956 A * 1/1961 Dranetz ................. 310/337 X
3,360,664 A * 12/1967 Straube ..................... 310/330
3,663,933 A * 5/1972 Madison ................. 310/337 X
3,988,620 A * 10/1976 McDavid ..................... 310/337
4,999,819 A 3/1991 Newnham et al.
5,724,315 A 3/1998 Moffett et al.

FOREIGN PATENT DOCUMENTS

| EP | 0 264 557 A2 | 4/1988 |
| GB | 992923 | 5/1965 |
| WO | WO 98/53924 | 12/1998 |

* cited by examiner

Primary Examiner—Mark O. Budd
(74) Attorney, Agent, or Firm—Crowell & Moring LLP

(57) ABSTRACT

This invention concerns a transducer comprising a layer of active material and a backing plate (110). The backing plate (110) has first and second major surfaces. A layer (111) of active material is affixed to the first surface. The transducer also includes a region adjacent to the second major surface into which region the backing plate (110) can be deflected. The region is substantially isolated from any external pressure incident on the layer of active material. Moreover, the backing plate (110) and/or layer of active material (111) is of a non-uniform thickness. Preferably, the backing plate (110) is thicker at a central region thereof than at an edge region thereof.

26 Claims, 4 Drawing Sheets

PRESSURE TOLERANT TRANSDUCER

FIELD OF THE INVENTION

The present invention relates to a pressure tolerant transducer for transforming energy from one form to another, for example for transforming electrical energy into acoustic energy or vice versa.

BACKGROUND OF THE INVENTION

Transducers, for example acoustic transducers, are well known in the prior art.

In a published international patent application no. WO 98/53924, there is disclosed a flexural plate sound transducer comprising a housing having an open central volume, a flexural plate attached around an inner surface of the housing and extending across the central volume, at least one piezoelectric element attached to a surface of the flexural plate. A mechanical hinge is formed near an outer periphery of the flexural plate and extends around the flexural plate. The mechanical hinge is formed such as to cause the flexural plate to move in a substantially piston-like manner when the piezoelectric element is energised. In the published application, the flexural plate and its associated at least one piezoelectric element are of uniform thickness except in the region where the hinge is formed.

In a published European application EP 0 264 557 A2, there is described a piezo-ceramic sound transducer comprising a metal membrane onto which is bonded in a central region thereof a piezo-ceramic slice. The membrane includes a support ring at a peripheral region thereof, and also a concentric ring-form compliant grove in the membrane between the slice and the support ring. The membrane is of uniform thickness even in the grove.

In a U.S. Pat. No. 5,724,315, there is described an omni-directional ultrasonic microprobe hydrophone. The hydrophone comprises two sensing elements where each element is composed of lead zirconate titanate and includes a plurality of columnar voids. In the hydrophone, the elements are bonded to an associated substrate material in the form of a backing plate. The voids are located in the hydrophone between the backing plate and the elements, the voids forming compressible cavities.

The inventors have appreciated that transducer structures known in the art often experience difficulties coping with relatively elevated environmental pressures applied thereto. Thus, the inventors have developed an alternative transducer exhibiting enhanced resilience to elevated environmental pressure, for example as experienced at a depth in the order of 200 m in aquatic environments.

SUMMARY OF THE INVENTION

The present invention seeks to provide a transducer incorporating a plate structure which is so constructed that it provides a workably low resonant frequency and which is capable of operating under extreme conditions, for example at large depths underwater in the order of 200 m.

According to a first aspect of the present invention, there is provided a transducer comprising a layer of active material, a backing plate having first and second major surfaces, to the first surface of which is affixed a layer of active material, and a region adjacent to the second major surface into which region the backing plate can be deflected, the region being substantially isolated from any external pressure incident on the layer of active material, wherein the backing plate and/or layer of active material is of a non-uniform thickness.

The invention provides the advantage that the transducer is capable of being used in applications where the transducer is exposed to relatively high external pressures.

One specific usage is where hydrostatic pressure is encountered when the transducer is used underwater. Thus, a transducer of the invention which acts in use to transform electrical energy into acoustic energy may be utilised as a 'projector' in a sonar system where the acoustic energy is broadcast into water. Alternatively, or in addition to, the transducer of the invention may be utilised as a hydrophone in a sonar system where it acts to transform acoustic energy into electrical energy.

Other applications envisaged for the transducer include diver-to-diver, ship-to-diver and ship-to-ship communications systems, and ships in these contexts should be understood to include 'submarines'.

The transducer with which the present invention is concerned is of the type which includes a plate structure comprising a backing plate to at least one side, namely a major surface, of which an active material is applied. In the context of the present invention, an active material is defined as:

(a) a polarised or unpolarised material, such as lead-zirconate titanate, lead titanate, barium titanate, lead metaniobate, lead magnesium niobate/lead titanate (typically either ceramic or single crystalline) or nickel;

(b) a piezo-electric material, such as crystalline quartz; or (c) a magnetostrictive material, such as Terfenol-D.

When the transducer is in use, the active material is deformed by the application of energy in one form and converts that energy into a different form. Thus, in one type of transducer for example, an alternating potential is applied to the two major surfaces of the active material plate via metal electrodes. Such excitation produces an alternating electrical field across the thickness of the active material plate. In response to this field, the plate attempts to expand or contract in the direction of its plane, that is radially in the case of a disc-shaped plate. The backing plate, to which the active material plate is bonded, constrains most of the said strain at or near the bond line. The side of the active material plate remote from the bond line, however, remains reasonably free to expand and contract. The composite plate therefore undergoes periodic flexure. In the case of an underwater projector, this movement is communicated to the surrounding water, and the energy is propagated away as sound.

In transducers where an active material plate is bonded to each side of a backing plate, the electrical field will be applied to each active material plate in such a phase relation so that the active plates flex in opposite directions, thereby reinforcing each other's action.

Because of its flexural action, such a transducer is sometimes referred to as a 'bender'.

The invention provides an improved plate structure which overcomes problems associated with conventional prior art plate structures.

In this regard FIG. 1A shows a section through one face of a prior art plate structure, and FIG. 1B is a plan view of the plate structure of FIG. 1A.

The plate structure 1 comprises a backing plate 10 which is flat and of uniform thickness. The backing plate 10 is generally symmetrical; the plate 10 is shown as circular but other shapes are possible. Attached to at least one side of the backing plate 10 is a layer 11 of the active material, for example a polarised electrostrictive material. The layer 11 as shown itself takes the form of a circular plate which is flat and of uniform thickness and which is attached to the backing plate 12 by suitable attachment means 13.

As shown, the layer 11 is of such a size that there is an annular area 12 of the backing plate 10 adjacent the outer circumference thereof which is free of active material, although such an area does not necessarily have to be provided.

It is further known to have layers, for example in plate form, of the active material on both sides of the backing plate; such a configuration is described in a published international application WO 98/53924.

The backing plate 10 may be supported on a support structure which can take various forms as shown below.

Further and as illustrated in FIG. 2 it is known to utilise two plate structures of a type illustrated in FIG. 1 in a transducer. In FIG. 2 the two structures 1 are separated by an annular support element 20 which is affixed at or near the outer circumference of the backing plate(s) 10 to support and separate the two plate structures. The space between the plate structures can be filled with a gas (for example air) or liquid.

Such a prior art structure will, when used underwater, experience hydrostatic pressure from the water, which pressure will increase with depth; such pressure is liable to cause deleterious effects on the structure. Depending on the precise make-up of the structure, there will be a limit to the depth at which the transducer can be used before one or both of the following deleterious consequences ensue:

(i) the backing plate and/or the active plate will physically collapse;

(ii) in the case of polarised active material, the material will suffer depolarisation.

A requirement of a sonar device is that it shall be capable of delivering useful quantities of acoustic power, with a reasonable level of efficiency. In a sonar device incorporating a composite plate structure, the value of the resonance frequency will be determined by the stiffness and masses of the components of the plate structure according to the equation:

$$v_0 = \frac{1}{2\pi\sqrt{(MC)}}$$

where $v_0$ is the fundamental resonance frequency;

M is the collective effective mass of the relevant components of the structure;

C is the collective effective compliance of the relevant components of the structure.

It is to be noted that compliance is the inverse of stiffness.

The achievement of a low fundamental resonance frequency requires, therefore, large mass and/or large compliance. The compliance of the device is approximately proportional to $\{1/(\text{thickness})^3\}$ of the active material plate and the backing plate; therefore thickening a plate in order to allow the device to operate at greater maximum depth will reduce its effective compliance substantially more than it will increase its effective mass, hence raising the fundamental resonance frequency of the device. There is, therefore, a conflict between the requirements to operate the transducer at a considerable depth and at low fundamental resonance frequency.

The present invention seeks to provide a transducer incorporating a plate structure which is so constructed that it resolves this conflict and which is capable of operating under extreme conditions, for example at large depths underwater in the order of 200 m.

In the transducer according to the first aspect of the invention, it is preferable that the backing plate is of non-uniform thickness.

Preferably the backing plate is supported around its periphery on a support member.

The backing plate may be thicker at a central region thereof than at an edge region thereof.

It is also envisaged that the backing plate may be formed with an outer lip portion of increased thickness relative to an inner region, and in such an arrangement the lip may be bonded to the support structure.

The active material may be encapsulated in a layer of a polymer material.

Also the transducer may have a recess adapted to receive a flexible elongate tensile member, for example a cable; such a recess may be formed in the layer of polymer material.

The support member may support two backing plates and associated active layers, the second major surfaces of the backing plates and the support structure defining a common region substantially isolated from any external pressure incident on the layers of active material.

It is envisaged that a hydrophone and/or projector may comprise a plurality of transducers as delineated above wherein two said transducers are linked by a cable, and wherein prior to deployment the cable is stored in a recess about the active layer with adjacent transducers being arranged together in close proximity such as to provide a housing for the cable prior to deployment.

According to a further aspect, the invention provides a transducer for converting one form of energy into another form of energy comprising a plate structure comprising a backing plate to at least one side of which is affixed an active material which plate structure incorporates a recess adapted to receive a flexible elongate tensile member.

The transducer of the invention may be operable in use to convert electrical energy into acoustic energy and/or may be operable in use to convert acoustic energy into electrical energy.

The transducer of the invention may be used underwater and may be included in a sonar system.

DETAILED DESCRIPTION OF THE INVENTION

Embodiments of the invention will now be described, by way of example only, with reference to the accompanying drawings wherein.

As described above, the transducer with which the present invention is concerned operates to convert one form of energy to another form of energy by means of the deformation of a material, referred to as an 'active' material, supported on a backing plate. Because the transducer functions by deformation, the transducer may be referred to in the art as a 'bender'.

The active material is caused to resonate in such a way that the energy conversion takes place in a controlled and predictable manner. Thus, if the bender transducer is used as a transmitter, it will usually be driven within its resonant bandwidth. This is usually considered to be the resonance frequency ($v_0$) itself, and to the −3 dB points in terms of the device's maximum electrical conductance ($G_{max}$), that is between the frequencies at which the conductance equals $G_{max}/2$, though other definitions may be applied.

If the device is used as a receiver, it may be used at resonance, or it may be used across a wide frequency band well below $v_0$.

A bender transducer may, in particular, be used under water either as a transmitter, namely as a "projector", or as a receiver, namely as a "hydrophone", or as both.

If used as a transmitter, the device will be driven with an electrical field alternating at the frequency at which the sound is desired. If it is used as a receiver, it will respond to incoming alternating pressure waves, that is sound, at whatever frequency or frequencies they happen to be, and the device will produce corresponding electrical signals oscillating at the same frequency or frequencies respectively.

Figure 1A:
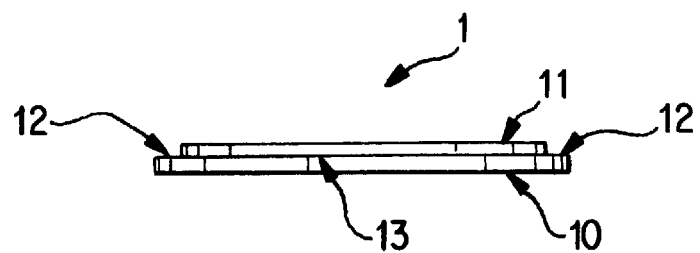
FIG. 1 is an illustration of a composite plate structure for use in a transducer and constructed according to the prior art.
Figure 1B:
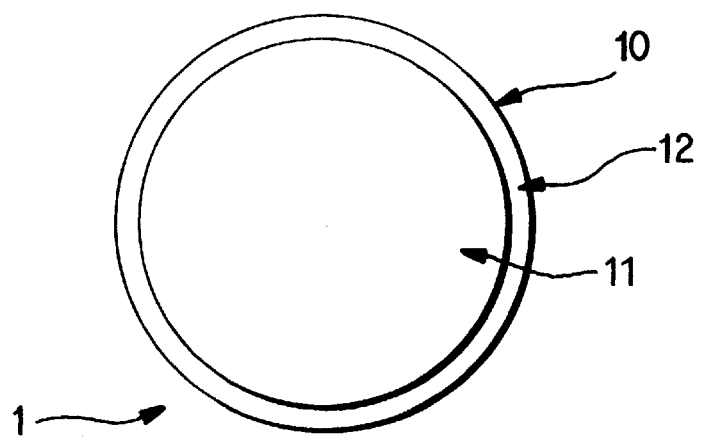
Figure 2:
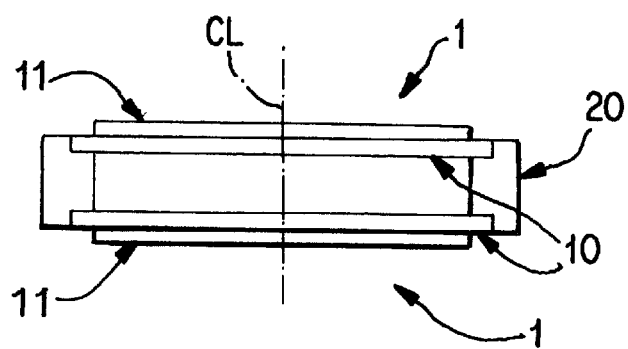
FIG. 2 is an illustration of a prior art arrangement utilising two composite plate structures separated by a support element.

FIGS. 1A and 1B illustrate diagrammatically a section through a conventional plate structure 1 for use in such a transducer and FIG. 2 illustrates the plate structure supported on a support element.

The problems encountered with the prior art transducers incorporating these conventional plate structures have been rehearsed above in detail but involve the deleterious effects caused by the large hydrostatic pressure when the transducer is used at depths.

Figure 3:
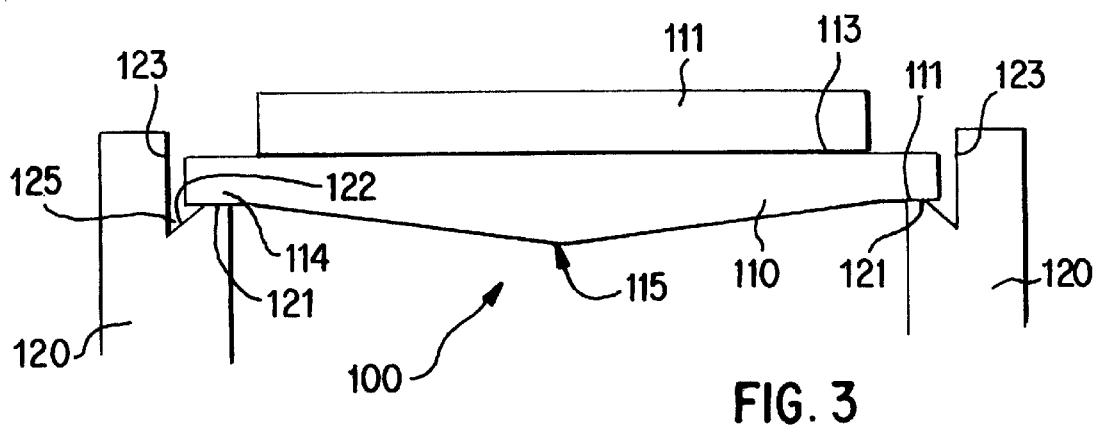
FIG. 3 is an illustration of a first embodiment of the invention, the embodiment comprising a transducer including a composite plate structure.

In FIG. 3 is shown a plate structure 100 for a transducer according to the invention. The plate structure 100 comprises a steel backing plate 110 of substantially circular shape. To one side of the backing plate a layer 111 of active material in the form of a plate is affixed by affixing means 113, for example an adhesive or solder. The backing plate 110 instead of being of uniform thickness as in the prior art arrangement has a non-uniform thickness. More particularly, the plate 110 has its greatest thickness at the centre thereof so that the plate comes to a point 115 and the thickness diminishes from the centre towards the outer circumference thereof. At an adjacent outer circumference of the backing plate there is formed a region 114 of reduced and substantially uniform thickness.

The active material may be of any suitable composition. For example, it may be:

(a) a polarised or unpolarised electrostrictive material such as lead-zirconate titanate, lead titanate, barium titanate, lead metaniobate, lead magnesium niobate/ lead titanate (all either ceramic or single crystalline), or nickel; or (b) a piezoelectric material such as crystalline quartz; or (c) a magnetostrictive material such as Terfenol D.

In operation of the transducer as a projector with two or four active material plates, an alternating voltage is applied across each side of each active material plate, usually in the same amplitude to each plate in such a phase relation between one plates and its nearest adjacent plate(s) that the plates flex in opposite directions; for example, the phase relation can be π radians out of phase between one plate and its nearest adjacent plate(s), the plates being electrically connected. This results in the application of a periodic bending moment across each composite plate structure. This causes periodic mechanical strain which is communicated to the water in which the transducer is immersed and is transformed to acoustic energy which is radiated away. On the other hand, in operation as a hydrophone, incoming acoustic energy will deform the active material plate which generates electrical signals which can be amplified and analysed.

A polarised electrostrictive material will be affixed to its backing plate after having been raised above a transition temperature, namely its "Curie" temperature, when a polarising electric field will be applied across it. This polarisation is necessary for the material to function in a transducer. In the prior art arrangements of FIGS. 1A, 1B, 2 application of stress, induced by for example hydrostatic depth pressure, will depolarise the material rendering it useless for its function in a transducer; the transducer will not thereafter be able to convert electrical energy into mechanical strain or vice versa.

Figure 4:
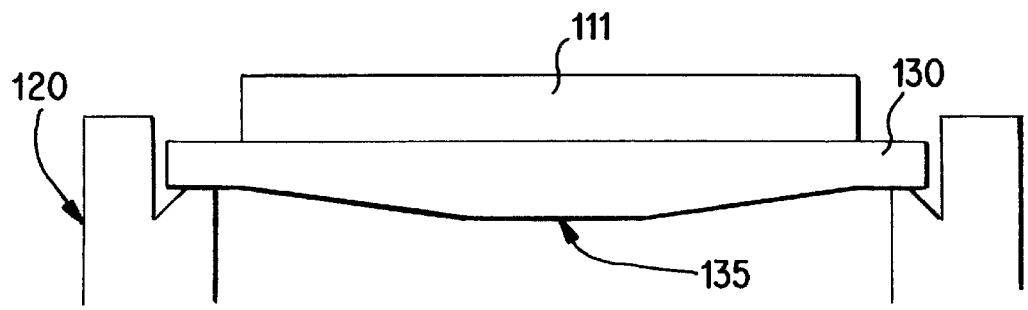
FIG. 4 is an illustration of a second embodiment of the invention, the embodiment comprising a transducer including a composite plate structure.

In the embodiment of FIG. 4 the plate structure of FIG. 3 is modified in that the central region 135 of the backing plate 130 on the side opposite to that to which layer 111 is attached is flattened so that a plateau 135 is formed in that region rather than the point 125 of FIG. 3. The overall thickness of the plate structure is thereby reduced and this allows a plurality of such plate structures to be packed into a smaller volume than would otherwise be the case; such packing will be described in more detail later.

Although the layer of active material is shown as a plate it can be formed on the backing plate by any suitable means The layer, namely the plate, of active material may also or alternatively be of variable thickness.

By suitable controlled shaping of the thickness of the backing plate and the active layer the plate structure may be 'tuned' to any specific fundamental resonance frequency.

In this regard the resonance frequency may, in principle, be derived from a relationship $v_0=1/(2\pi\sqrt{MC})$ as described above. Varying the dimensions and/or materials of the constituent plates of the composite plate, and changing the design of the "hinge" region, will alter M and C, and hence alter $v_0$. In a composite plate, in which the backing plate is profiled, theoretical tuning of the device may be accomplished by means of finite/boundary element analysis. Such analysis should be followed by construction of a corresponding prototype device.

In the prior art, most of the stress induced in the active material plate by externally-applied hydrostatic pressure, such as by deep immersion in an ocean, will occur at its centre, and little stress will occur towards its perimeter. Profiling the backing plate enables the stress distribution in the active material plate to be equalised. The elimination of regions of stress concentration in the active material helps permit operation at enhanced depths. In particular, the most commonly used active materials are polarised electrostrictive ceramics of lead-zirconate titanate. Externally-imposed depth pressure will cause:

(i) loss of polarisation and hence loss of the capability to convert electrical signals to flexural motion, and vice versa; and (ii) eventual physical destruction by cracking.

In the prior art, most of the strain induced in an active material plate by an applied alternating electrical field, or by impinging acoustic waves, will occur at its centre, and little strain will occur towards its perimeter, so a relatively small proportion of the volume of the active material plate will be utilised for energy conversion, which will have a deleterious effect upon the efficiency of the device.

A further benefit of the invention is that equalisation of stress and strain distribution in the active material plate will bring about utilisation of a greater volume of the active material plate for the conversion of electrical energy to acoustic energy, and acoustic energy to electrical energy, hence improving the efficiency of the device.

The plate structure may be supported on a support, for example a spacer which incorporates a passive mass.

Figure 7:
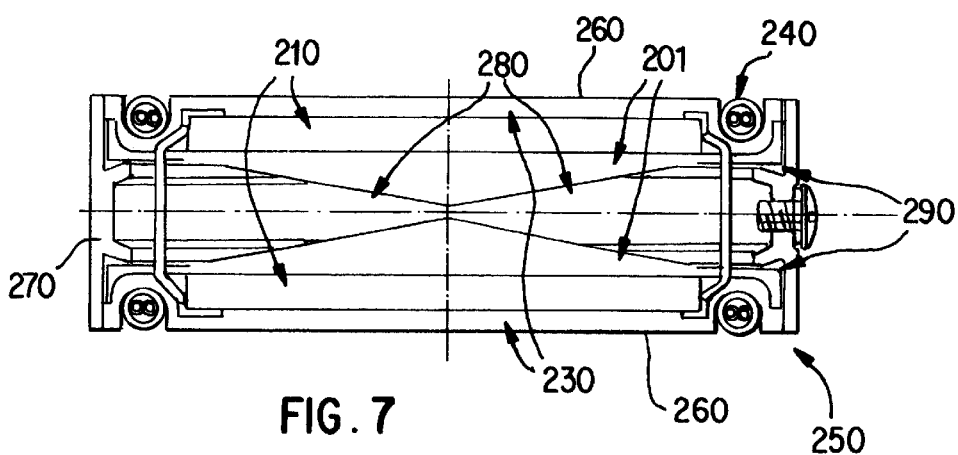
FIG. 7 is a sectional view through a composite plate structure of a transducer according to the invention, such structure being associated with a cable whereby it is connectable to other such composite plate structures.

However, both FIGS. 3 and 4 show the respective plate structures 110, 130 mounted on a support structure 120. In the case of a circular backing plate this support structure will conveniently be of annular form but other forms are possible. The backing plate is secured to the support structure by any suitable means, for example by resin adhesive bonding or by utilising solder. It is to be understood that the support structure may further support a second composite plate structure opposed to the first; such a composite structure is illustrated in FIG. 7.

As shown in FIGS. 3, 4 the support structure 120 is of generally columnar section but has a portion cut-away at its end adjacent the outer edge region of the backing plate 110. More especially the cut-away portion is formed to provide a planar section 121 which is attached to a planar edge region 114 of the backing plate 110; the cut-away portion further comprises an angled portion 122 and an axially extending portion 123. By virtue of the cut-away a recess 125 is formed in the support 120 adjacent to the outer edge region of the backing plate. As shown, this recess 125 is of generally triangular cross-section but it is to be understood that other forms are possible.

It is to be understood that when the plate structure resonates by moving in a pivoting back-and-forth motion; during such movement, interengaging portions of the edge region of the backing plate 110, 130 and of the support structure form a hinge arrangement. By incorporating a recess as shown in the support structure the effective compliance of the transducer is increased. Indeed, the dimensions of the recess may be chosen to tune the transducer to the required fundamental resonance frequency.

Figure 5:
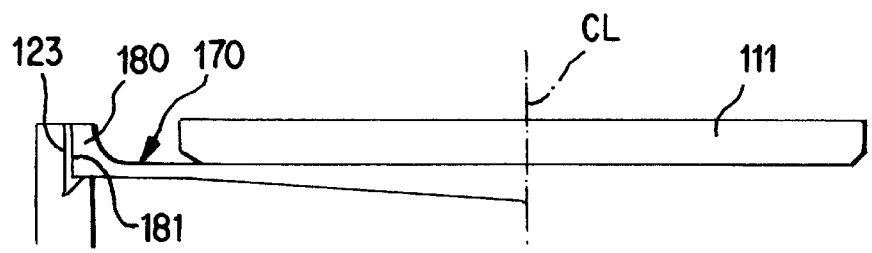
FIG. 5 is an illustration of a third embodiment of the invention, the embodiment comprising a transducer including a composite plate structure.

FIG. 5 shows a modification of the plate structure of FIG. 3 or FIG. 4 in which the radially outer region of the backing plate 170 of a composite plate structure is formed with a region 180 of increased thickness. In effect the region constitutes an axially extending projection whose radially outer surface 181 engages the axially extending portion 123 of the support structure. It provides an increased area for attachment, for example attachment by bonding, to the support structure which is important for preventing detachment of the plate structure from the support under conditions of high electrical drive at low hydrostatic pressure, for example at shallow depths in the order of 1 to 10 m, without increasing the maximum thickness of the composite plate structure. The projection is also useful in production of the backing plate since it provides a means by which the plate can be held during lathe-turning operations for example.

Figure 6:
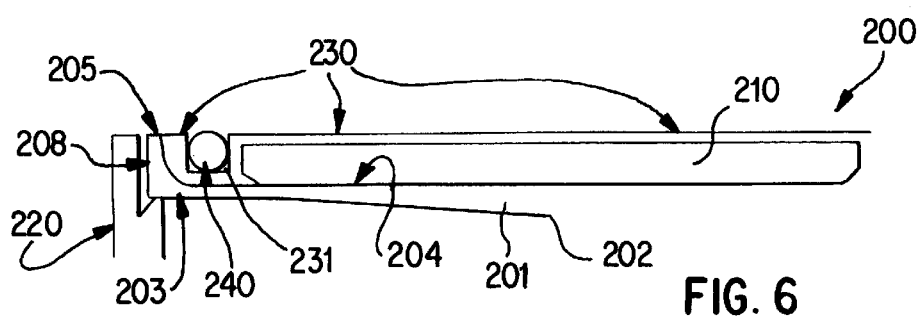
FIG. 6 is an illustration of a fourth embodiment of the invention, the embodiment comprising a transducer including a composite plate structure.

It is to be understood that for acoustic energy—electric energy transducers which are to be used underwater those parts of the transducers which are electrically live in use must be protected from electrical contact with the water. In one method of achieving such protection, the transducer is immersed in an electrically insulating liquid, such as castor oil, enclosed within an acoustically-transparent container. In another method, at least the live parts of the transducer are encapsulated in an acoustically-transparent polymer such as polyurethane; this method can be refined such that the recess for the flexible elongate member may actually be formed within the polymeric encapsulation. The recess is illustrated in FIG. 6; further details of embodiments of the invention incorporating such a recess are given later.

It is envisaged that a number of transducers utilising the plate structure as described above may be used together; where the transducer is used in a sonar system, the transducers may be deployed under water. Such transducers will conventionally be connected together by a flexible elongate tensile member which, for example, may take the form of an electrically conducting cable.

The plate structures as delineated above may be modified to provide a storage means for this tensile member when a plurality of transducers for deployment together are stored prior to deployment, for example stacked in a tubular container.

More particularly, the outer edge region of the plate structure may be formed with a recess to receive the tensile member and in the case of circular backing plates the recess will preferably be of annular form extending circumferentially of the backing plate.

Figure 8:
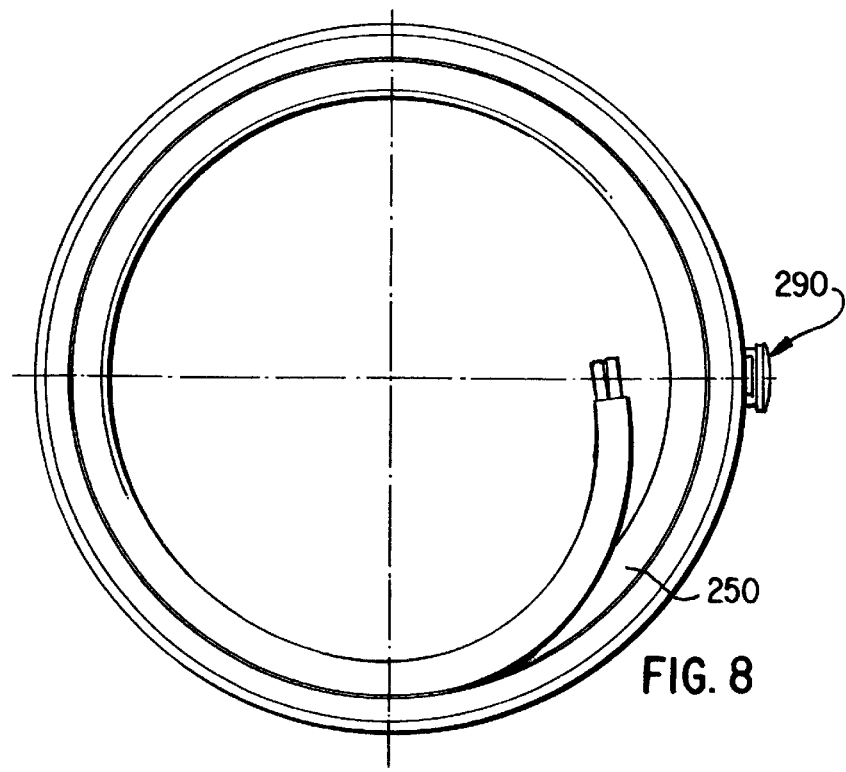
FIG. 8 is a plan view of the structure of FIG. 7.

Detailed embodiments of arrangements incorporating such recesses are shown in FIGS. 6, 7 and 8.

In FIG. 6 the composite plate structure 200 comprises a backing plate 201 whose thickness varies across the plate. Its thickness diminishes from the centre 202 of the plate 201 towards the edge region 203 thereof. At the edge region 203 the plate is formed with a region 208 of increased thickness which is bonded to a support structure 220. Affixed to the surface 204 of the backing plate 201 is plate 210 formed of active material which plate 210 itself may be of variable thickness thereacross. The exposed surfaces of the plate 210 are covered in an acoustically-transparent polymer 230 such as a polyurethane applied, for example by casting with the aid of a mould tool or by dip-coating.

The coating 230 of polymer also extends over part of the exposed edge region 203 of the bacilng plate 201 although the upper surface 20S of region 203 need not be coated. The coating 230 is formed in such a way that a recess 231 is provided therein. The recess 231 is provided adjacent the outer edge region 203 of the backing plate 201 and is of annular form; it is bounded by the polymer coating 230 on three sides and is open at the top whereby to be able to receive a flexible elongate tensile member 240. In effect the tensile member 240 is nested in use in the recess 231. The tensile member may be connected to an electrical driving source or body 300 as illustrated in FIG. 9.

FIG. 7 shows a section through a transducer 250 with two opposed composite plate structures 260 affixed to a support structure 270. The volume 280 defined between the plate structures 260 and the support structure 270 is filled with a suitable substance which could be a liquid, a gas (for example air), or a foamed material. Where the volume is to be filled with a gas or liquid the transducer may be provided with a valve 290 provided in the support structure for ingress/egress of the gas or liquid.

Figure 9:
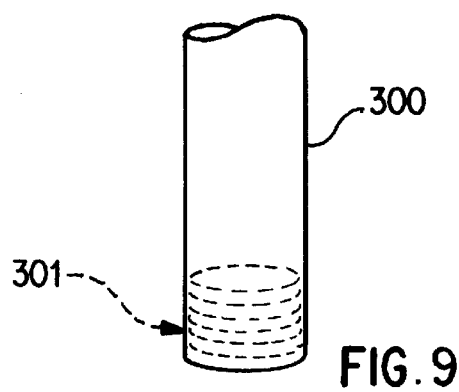
FIG. 9 is a schematic illustration of a plurality of transducers comprising composite plate structures packed in a container prior to deployment underwater.

FIG. 9 is a diagrammatic illustration of transducers stacked in a tubular container 300 prior to deployment in an underwater environment. The plate structures are arranged immediately adjacent one another with the tensile members arranged in the recesses.

Figure 10:
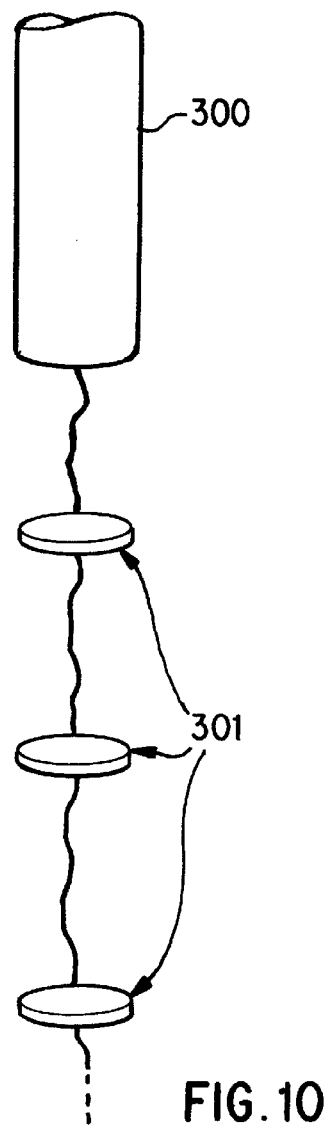
FIG. 10 is a schematic illustration of the composite plate structures when deployed from the container of FIG. 9.

FIG. 10 shows the transducers as deployed, with the elongate tensile members therebetween extended.

What is claimed is:

1. A transducer comprising a layer of active material and a backing plate having first and second major surfaces, the layer of active material being affixed to the first major surface, there being a region defined adjacent to the second major surface into which region the back plate can be deflected, the region being substantially isolated from any external pressure incident on the layer of active material, wherein at least one of said backing plate and said layer of active material includes means for controlling stress distribution in the transducer, said means comprising a nonuniform thickness of said at least one of said backing plate and said layer of active material.

2. A transducer according to claim 1 wherein the backing plate is of non-uniform thickness.

3. A transducer according to claim 1 wherein the backing plate is supported around its periphery on a support member.

4. A transducer according to claim 1 wherein the backing plate is thicker at a central region thereof than at an edge region thereof.

5. A transducer according to claim 1 wherein the backing plate is formed with an outer lip portion of increased thickness relative to an inner region.

6. A transducer according to claim 5 wherein the lip is bonded to the support structure.

7. A transducer as claimed in claim 1 wherein the active material is encapsulated in a layer of a polymer material.

8. A transducer as claimed in claim 1 having a recess in which a flexible elongate tensile member is received.

9. A transducer as claimed in claim 8 wherein the recess is formed in a layer of polymer material encapsulating said active material.

10. A transducer as claimed in claim 8 wherein the flexible elongate tensile member is a cable.

11. A transducer as claimed in claim 7 in combination with at least one said flexible elongate member and at least one other transducer.

12. A transducer as claimed in claim 3 wherein the support member supports two backing plates and associated active layers, the second major surfaces of the backing plates and the support structure defining a common region substantially isolated from any external pressure incident on the layers of active material.

13. A hydrophone and/or projector comprising a plurality of transducers as claimed in claim 1 and a cable adapted to link two said transducers, and wherein the cable is stored in a recess about the active layer of one of said transducers with adjacent transducers being arranged together in close proximity such as to provide a housing for the cable prior to deployment.

14. A transducer for converting one form of energy into another form of energy comprising a plate structure comprising a backing plate to at least one side of which affixed an active material which plate structure incorporates a recess and a flexible elongate tensile member received in said recess.

15. A transducer as claimed in claim 1 operable to convert electrical energy into acoustic energy.

16. A transducer as claimed in claim 1 operable to convert acoustic energy into electrical energy.

17. A transducer as claimed in claim 1 adapted for use underwater.

18. A sonar system incorporating a transducer as claimed in claim 1.

19. A transducer according to claim 2 wherein the backing plate is formed with an outer lip portion of increased thickness relative to an inner region.

20. A transducer according to claim 3 wherein the backing plate is formed with an outer lip portion with an increased thickness relative to an inner region.

21. An transducer according to claim 4 wherein the backing plate is formed with an outer lip portion with an increased thickness relative to an inner region.

22. A transducer as claimed in claim 9 wherein the flexible elongate tensile member is a cable.

23. A transducer as claimed in claim 1 wherein the nonuniform thickness is distributed over said backing plate and/or the layer of active material to achieve equalized stress distribution in the transducer.

24. A transducer as recited in claim 1 wherein the non-uniform thickness is distributed over the major portion of said backing plate.

25. A transducer comprising a layer of active material and a backing plate having first and second major surfaces, the layer of active material being affixed to the first major surface, there being a region defined adjacent to the second major surface into which region the back plate can be deflected, the region being substantially isolated from any external pressure incident on the layer of active material, wherein at least one of the backing plate and the layer of active material has a non-uniform thickness which varies over a substantial portion of a radial dimension thereof, from a relatively thicker central area to a relatively thinner peripheral area thereof.

26. A transducer comprising a layer of active material and a backing plate having first and second major surfaces, the layer of active material being affixed to the first major surface, there being a region defined adjacent to the second major surface into which region the back plate can be deflected, the region being substantially isolated from any external pressure incident on the layer of active material, wherein at least one of the backing plate and the layer of active material has a non-uniform thickness which varies gradually in a radially outward direction, from a relatively thicker central portion thereof toward a relatively thinner periphery thereof, providing a control of stress distribution in the transducer.

* * * * *